Patented May 18, 1943

2,319,453

UNITED STATES PATENT OFFICE 2,319,453

PROCESS FOR ACTIVATING CATALYTIC SURFACES

Marion H. Gwynn, Leonia, N. J.

No Drawing. Application May 31, 1940,
Serial No. 338,233

7 Claims. (Cl. 252—255)

This invention relates to the preparation of highly active hydrated and black catalytic surfaces or surface layers by treating a metal such as cobalt or nickel with an aqueous solution of a chlorite. The surfaces are preferably in a roughened, foraminous or oxidized state prior to the chlorite treatment. The chlorite treated surfaces or surface layers may be used in hydrofining, i. e., hydrogenating and/or refining oils and other carbonaceous compounds, particularly in sulphur sensitive hydrofining. These surface layers, especially in conjunction with a promoter for dehydration, are extraordinarily catalytic for the conversion of water gas to light hydrocarbons and like compounds. The treated surface layers may also be used as reagents, as for example in the formation of metallic sulphides or carbonyls, or as adsorption or purifying agents, as in the treatment of vegetable or animal glycerides before steam deodorization, or as when doctor sweetening light petroleum or like distillates; or as tower packing or otherwise.

U. S. Patent #2,191,464, issued to me February 27, 1940, describes a similar use of highly alkaline hypochlorites or hypobromites. I am able to activate adherent surfaces with chlorites at higher temperatures and concentrations and with relatively much less alkali.

For example, I may prepare highly active hydrated and black fixed catalytic surfaces or surface layers by preliminarily treating a metal such as cobalt or nickel in a foraminate state to form an adherent surface layer which is moderately catalytic with or without gentle roasting. The surface comprising the preliminarily treated surface layer is then oxidized until highly catalytic with an aqueous chlorite solution. The chlorite solution preferred contains a limited excess of alkali of insufficient concentration to exert a solvent action on the surface layer. The catalyst produced in this way without further chemical treatment is ready for use in hydrofining operations and maintains its activity substantially uniform during hydrofining until spent. Instead of starting with a new metal surface or with a surface comprising a readily oxidizable compound of the catalytic metal I may start with surfaces which have been used in hydrogenation and which must be reactivated. When my invention is used to reactivate catalyst surfaces containing sulphur, I prefer to remove most of the sulphur prior to the chlorite treatment, as will be described.

According to my invention, instead of using a chlorite solution I may use chlorine dioxide or other halites, particularly bromites, to produce catalysts, and these catalysts are usable as such without requiring further chemical treatment.

Extremely alkaline halite solutions may be concentrated with respect to sodium hydroxide, and such solutions are undesirable. I prefer to use halite solutions neither extremely acidic nor extremely alkaline. Within these limits, I find that increasing the alkalinity of the chlorite solution improves the adherence, decreases the metal losses by solubility, but inhibits the depth of the activated film and the attack on untreated metal. When the metallic surface is pretreated as subsequently described, I prefer to use a dilute alkaline halite solution, for example a sodium chlorite solution or a concentrated sodium chlorite solution to which has been added dilute alkali.

However, I may also use acid chlorite solutions, particularly when the metal salt of the acid is insoluble, for example oxalic acid when blackening nickel or cobalt. Although a small portion of the metal may be carried into solution, a mixture of oxalic acid and sodium chlorite has an advantage of rapid and deep peroxidation, and of requiring little or no preliminary oxidizing treatment. Thus an acid chlorite treatment is particularly useful as a first or preliminary treatment, which may be followed by an alkaline chlorite treatment. Thus hydroxide, carbonate and oxalate ions are useful additions to aqueous chlorite solutions. All three of these anions are complex and contain oxygen but no chlorine; nickel or cobalt hydroxides, carbonates and oxalates are water insoluble.

My invention is not limited to cobalt and nickel, it being within the contemplation of my invention also to use metal alloys of face center cubic crystal lattice, which are neither extremely electropositive nor extremely electronegative, especially if they are readily reducible and if they are secondarily ferromagnetic like cobalt or nickel in the metallic state. For example, I may use a readily reducible mixture of hydrated and oxidizable compounds containing copper and manganese, which mixture is secondarily ferromagnetic when reduced to the metallic state.

I will now give some examples by way of illustration of how my invention is to be practiced, but I am not to be limited thereto, as they may be modified in many particulars without departing from the spirit of the invention. The resulting activated surfaces have specific as well as general usage.

*Example 1*

A highly active catalyst promoted for dehyration and particularly catalytic for the conversion of carbon monoxide and hydrogen to hydrocarbons, such as motor fuels, and containing hydrated cobalt silicate and hydrated cobalt oxides, is prepared as follows:

A new cobalt or cobalt coated mass and with the surface layer in a foraminate state, is connected as the anode in an electrolyte composed of commercial water glass at about 30° C. and a current density of about 5 milliamperes per square centimeter is applied for sufficient time to form a deep blue coating containing hydrated silica and hydrated silicate of cobalt on the surface.

The treated mass is removed, drained and immersed in a highly alkaline aqueous solution maintained at room temperature made by mixing equal volumes of a dilute sodium hydroxide solution with warm aqueous sodium chlorite solution. The solution may be gradually heated as blackening of surface layer begins. Immersion is continued until the surface film appears deep and black, or until the efficiency of the oxidation markedly decreases; or until the depth of the oxidized surface layer is in excess of $10^3$ or $10^4$ metal atoms; or until the surface layer is highly catalytic without further chemical treatment.

The blackened mass is then withdrawn, drained and carefully washed with water. Before the water wash, other means such as a salt water wash may be employed to facilitate removal of the anions of the halite solution without loss of catalyst. The washed surface layer is highly catalytic without further treatment. When the treated catalytic mass is used for hydrofining, any water remaining on the catalytic surface is preferably removed with warmed hydrogen.

Other concentrated alkaline electrolytes depositing a dehydration promoter in the surface layer may be substituted for the water glass, particularly those concentrated and colloidal and which gel on the slight addition of acid.

Example 2

A cobalt or cobalt coated mass is connected as the anode in an electrolyte composed of 5 normal aqueous hydrofluoric acid at room temperature. The current density and voltage are then adjusted to form a deep adherent film on the cobalt mass. For instance, about 4 volts are first applied and as the current density or current efficiency diminishes, the potential may be increased continuously or discontinuously to 5 or 6 volts or even much higher, preferably maintaining the bath cold and the product of the current density and current efficiency no greater than about that of the original product thereof. When the current efficiency substantially decreases or when a deep black surface layer is formed the mass is withdrawn, drained and washed, and then treated with the halite solution and finished as given in Example 1.

Other strong acid electrolytes may be substituted for hydrofluoric acid, preferably decomposable and in a concentration at which the activity coefficient is low. Such acids with or without impressed electrical potential may be used to treat these and other surfaces prior to halite activation, as for example those spent in hydrofining.

Hydration of the surface layer prior to halite activation may be obtained as in the previous examples, or during reaction with steam, or by other methods or combinations of methods. Hydration is particularly desirable if the oxidizable compounds of the catalytic metal in the surface layer before treatment are salts and are not readily reducible to the metallic state unless oxidized. If the salts comprising said surface layer before halite treatment are neither readily reducible to the metallic state not insoluble in the halite solution, they should be gently roasted until moderately catalytic, as with the nitrates in Examples 3 or 4 (to be later given herein).

The surface layer prepared for halite oxidation may consist of a characteristically colored salt, and such salts are generally hydrated. If such a salt resists halite oxidation, its resistance may be decreased by further treating before the oxidation as with an alkali solution of low thermodynamic activity coefficient to change at least a portion of the salt to the hydroxide. If not well hydrated, the surface layer should be relatively deep and oxidizable, especially on metals like cobalt. A relatively shallow layer of adherent nickel hydroxide, or a somewhat thicker layer of adherent cobalt hydroxide suffices to initiate deeper oxidation of the catalytic surface with more alkaline and cooler halite solutions.

The reaction of the halite compounds with the surface layers appears to be partially autocatalytic and hence those agencies which initiate activation are useful. For instance, the more activatable compounds in or formed on the metal surfaces by proper pretreatments, during their reaction with the halite solution initiate the activation or oxidation of the more difficultly activatable compounds or by the underlying metal itself. Successive reactivations after using the catalyst for hydrogenation are generally accompanied by increases of the depth of the surface layer and receptivity to activation.

Example 3

A highly active catalyst for hydrofining organic compounds is made as follows:

A new nickel or nickel coated mass is pretreated several hours with the vapors of concentrated nitric acid at about 40° C. or 50° C. to pit the surface and to form a surface layer containing nickel nitrate. The surface layer, without washing, is then dried and gently heated in a current of air at near the lowest temperature required to evolve fumes and decompose a substantial portion of the resulting nickel nitrate and darken the mass, for instance at about 300° C. The resulting surface layer may be further activated by contacting with a more active halite than the one given in Example 1 in order to initiate the oxidation, as for instance, a more concentrated or less alkaline solution of chlorite. Specifically, the pretreated nickel mass is immersed in a heated alkaline aqueous solution consisting principally of sodium carbonate and sodium chlorite. If blackening does not begin within a few minutes, the alkaline chlorite solution is further heated, preferably without boiling, until the blackening is initiated. Then as the reaction proceeds the stability of the alkaline chlorite solution may be increased as by cooling or decreasing the chlorite concentration of the solution. The blackened mass is then withdrawn, drained and washed as given in Example 1.

Example 4

A new cobalt or cobalt coated mass is pretreated several hours with the vapors of boiling concentrated nitric acid to pit the surface and to form a surface layer containing cobalt nitrate, as described in my copending application, Serial Number 240,007, now U. S. Patent 2,270,874, granted January 27, 1942. The surface layer, without washing, is then dried and gently heated in a current of air at near the lowest temperature required to evolve fumes and decompose most of the resulting cobalt nitrate, for instance at about 300° C. Such moderately catalytic surface is further activated by contacting with a halite similar in stability to that described in Example 3.

The blackened mass is then withdrawn, drained and washed as given in Example 1.

A decomposed cobalt nitrate surface may be electrolytically treated, followed by chlorite oxidation and washing as given in Example 1 or 2. Other metals may be activated in the same manner, for example a decomposed nickel nitrate surface may be treated instead of the new cobalt mass given in Example 1.

After the halite treatment, a surface layer may be further chemically treated, for instance after the final washing in Example 2 or 3 or 4; the catalyst may be dipped in a strong aqueous solution of chromic acid or ammonium molybdate or thiomolybdate, then withdrawn and allowed to drain.

Example 5

Powder catalyst, particularly black nickel catalyst supported upon kieselguhr, may be chlorite reactivated. For example black nickel catalyst used and spent in the hydrogenation of a glyceride, such as refined cottonseed, corn or soybean oil, is solvent extracted to remove the residual hydrogenated oil and accompanying organic impurities. The extracted catalyst is then stirred with a heated dilute alkaline aqueous sodium chlorite solution until reactivated, and subsequently is washed to remove said activating solute. When reused for the hydrogenation of glycerides, the reactivated catalyst is preferably reduced in hydrogen prior to catalysis. If used for desulphurizing or for the hydrogenation of diisobutylene, benzene, phenol, or similar compounds, reduction of the catalyst, whether in powder or other form, may be undesirable prior to catalysis.

Before reactivating catalyst used for hydrogenating and/or purifying fatty or like compounds, the latter compounds or impurities may be removed or extracted as by refluxing with volatile hydrocarbons. Or more polar solvents such as dichlorethylene or acetone may be used, particularly for a final extraction or when using the catalyst as a purifying agent.

When the surface layers are heavily sulphided, the major part of the sulphur is preferably removed prior to halite reactivation. For instance, a nickel surface sulphided as described in my U. S. Patent 2,174,510, may be substantially but incompletely desulphided by roasting with steam and/or air. Subsequently the surfaces may be blackened and further desulphided by means of a chlorite treatment, for example an acid chlorite treat followed by an alkaline chlorite treatment.

Catalytic surfaces to be treated do not have to be disturbed for reactivation. If a vessel is lined with a catalytic surface, such liners may be activated. In the preparation of fixed catalyst on metal, the metal prior to chemical activation may be machined so as to produce burrs or grooves or may be worked as with heat and/or alloying to produce fine longitudinal cracks. Fixed catalyst such as a foraminate base metal or rough inert solid whose surfaces contain nickel or cobalt or like metal, or catalytic surfaces prepared by the various methods of the art, may be activated or reactivated according to my invention. An assembly such as described in my copending application Serial Number 297,651, filed October 3, 1939, may be chlorite activated as described. The solvent action of halite solutions on the catalytic surfaces may be diminished by other methods than my alkali control. For instance when the alkalinity is relatively small the solvent action of any free halous acid may be minimized by an unusual short time of contact so that the oxidized surface layer is relatively shallow. Or a surface layer may be contacted with a halite compound or chlorine dioxide in vapor form, preferably moist.

A halite treatment may be accompanied by other oxidizing agents or treatments. For instance wet oxygen or air may be mixed with gaseous chlorine dioxide and the mixture used to activate catalytic surfaces in the vapor phase. Or a surface layer undergoing activation may be treated with both air and a halite solution. For instance a chlorite solution may be continuously or intermittently sprayed over the surface undergoing activation.

What I claim is:

1. A process for preparing a highly active catalytic surface useful in hydrofining, which comprises activating a surface whose metal component is selected from the class which consists of nickel, cobalt and a ferromagnetic and readily reducible alloy, with an aqueous halite solution.

2. A process as described in claim 1, in which the aqueous halite solution is a chlorite solution and also contains substantial quantities of a complex anion containing oxygen, but not halogen, the metal salt of the anion being substantially insoluble in water.

3. A method of activating catalytic surfaces whose metal component is selected from a class which consists of nickel, cobalt, and a ferromagnetic and readily reducible alloy, which comprises preparing an adherent catalytic surface by contacting the surface in an oxidizable and foraminate state, with a dilute alkaline halite solution.

4. A method of activating catalytic surfaces whose metal component is selected from the class which consists of nickel, cobalt, and ferromagnetic and readily reducible alloy, which comprises the steps of gently roasting the surface until substantially converted to the oxide of the catalytic metal, and subsequently further oxidizing the surface with an aqueous halite solution.

5. A method of activating catalytic surfaces whose metal component is selected from the class which consists of nickel, cobalt, and a ferromagnetic and readily reducible alloy, which comprises the steps of roasting a metal sulphide surface with air and steam to convert most of said metal sulphide to the metal oxide, and subsequently treating with an aqueous chlorite solution to blacken and further remove sulphur from said surface.

6. A method as described in claim 5, in which the chlorite treatment is followed by treatment with another aqueous chlorite solution more alkaline than the previous chlorite solution.

7. A process for preparing a highly active and adherent catalytic surface which comprises the steps of forming a surface layer which contains an oxidizable hydrated compound of a metal selected from the class which consists of nickel, cobalt, and a ferromagnetic and readily reducible alloy, and subsequently treating the surface with a dilute alkaline halite solution.

M. H. GWYNN.